United States Patent [19]

Lejdegard

[11] 4,018,334
[45] Apr. 19, 1977

[54] FASTENER PACKAGE

[75] Inventor: Sixten H. Lejdegård, Ramnas, Sweden

[73] Assignee: Bulten-Kanthal Aktiebolag, Sweden

[22] Filed: Mar. 12, 1976

[21] Appl. No.: 666,200

Related U.S. Application Data

[63] Continuation of Ser. No. 446,413, Feb. 27, 1974, abandoned.

[30] Foreign Application Priority Data

Mar. 9, 1973 Sweden .............................. 7303332

[52] U.S. Cl. ................................. 206/346; 206/347
[51] Int. Cl.² ................. B65D 85/24; B65D 73/00; B65D 83/02
[58] Field of Search ........ 206/346, 347, 343, 345, 206/338, 389

[56] References Cited

UNITED STATES PATENTS

| | | | |
|---|---|---|---|
| 2,012,615 | 8/1935 | Mason | 206/343 |
| 2,784,405 | 3/1957 | Working, Jr. | 206/347 |
| 3,097,360 | 7/1963 | Carlson, Jr. et al. | 206/347 |
| 3,165,968 | 1/1965 | Anstett | 206/343 |
| 3,812,961 | 5/1974 | Merrick et al. | 206/338 |

*Primary Examiner*—William T. Dixson, Jr.
*Attorney, Agent, or Firm*—Hill, Gross, Simpson, Van Santen, Steadman, Chiara & Simpson

[57] ABSTRACT

A fastener package comprising a carrier tape having at equally spaced intervals throughgoing holes in each of which there is received from one side of the tape a screw with a head and a threaded shank, with the under side of the screw head resting against said one side of the tape. The holes are so designed and dimensioned in relation to the dimensions of the screw shanks that, on introduction of the screw shanks into the holes, the tape edges around the holes are deformed into lips which retainingly engage with the screw threads. Radial slots may facilitate the development of the retaining lips, and the slots may be long enough to permit deflection of the lips to let through the screw heads. Adjacent longitudinal slots may be so closely spaced that the tape is split up in two tape portions as the screws are driven home, through the tape.

7 Claims, 4 Drawing Figures

FASTENER PACKAGE

This is a continuation of application Ser. No. 446,413, filed Feb. 27, 1974, now abandoned.

BACKGROUND OF THE INVENTION

Fastener packages comprising an elongated tape carrying a plurality of spaced fasteners are known since long.

One such fastener package, described in U.S. Pat. No. 2,771,610 comprises an elongated tape which is reversely folded along one side edge thereof with the reversely folded portion disposed on the upper side of the tape and extending only partially toward the opposite edge of the tape, and fasteners having shanks extending through the tape at spaced intervals through that portion of the tape that is not covered by the reversely folded portions. The fasteners have heads disposed against the upper side of the tape and against that portion which is not covered by the reversely folded portion. The tape is weakened on laterally extending lines extending from each shank to the edge of the tape that has not been reversely folded.

Fastener packages of the just described type suffer from the drawback that the tape has to be pulled laterally away from the fastener after the fastener has been started by a light tap of a hammer. For this and other reasons a fastener package of the just discussed type cannot be used in a fastener applicator.

Another type of fastener package is disclosed in British Patent No. 1 284 035. In that patent screws are pressed at spaced intervals through a double thickness of flexible tape or sheet which layers are conveniently of identical small thickness and readily pierced by the screws. In the resultant combination of double-thickness tape and inserted screws each screw is surrounded, immediately adjacent the head, by two concentric collars, respectively provided by the two tape layers and which exert a grip on the screw shank so that the screw is firmly held in the tape. A secure grip is achieved particularly with a tapering screw shank and it has been expressly stated in the specification that a thread, if present on the shank, plays no essential part in attaining a secure grip.

The just described screw package is not intended to be and cannot be used in screw tightening apparatus because the concentric collars which frictionally grip the screw shank are apt to be torn away from the strip by the screw head as the screws are driven home, and to remain on the screw shank, thus leaving unsightly tape residues jammed between the under side of the screw and the workpiece.

Still another type of fastener package, particularly for comparatively short screws, comprises a rather thick tape of cardboard or plastic, which has laterally open slots or openings wherein the screws are laterally inserted in a manner to have the shanks thereof passing through the carrier tape. Fastener packages of this type have some advantages but they also suffer from certain drawbacks among which is notably that the screws are sometimes unsatisfactorily held in the tape.

BRIEF SUMMARY OF THE INVENTION

An important object of the present invention is to circumvent the drawbacks of fastener packages of the above mentioned types and of other known types by providing a simple, easy to manufacture and inexpensive fastener package which easily lends itself to be used in manually or automatically operated screw tightening apparatuses.

According to the invention the fastener package comprises a carrier tape having at equally spaced intervals throughgoing holes in each of which there is received from one side of the tape a screw with a head and a threaded shank with the under side of the screw head resting against said one side of the tape, said holes being so designed and dimensioned in relation to the dimension of the screw shanks that on introduction of the screw shanks into the holes the tape edges around the holes are deformed to form one or more lips which engage with the threads of the screw shanks to securely retain the screw in the hole with the under side of the head resting firmly against said one side of the tape.

Preferably, the tape edges around the holes are radially slotted so as to facilitate the deformation thereof into screw retaining lips. In one embodiment of the invention the radial slots are of such a length as to enable comparatively long lips to be formed, which lips deflect to leave an opening for passage of the screw head through the tape as the screw is driven home. In another embodiment of the invention the tape has the ends of the slots, radially of the holes and longitudinally of the tape, so closely spaced that the tape is split up into two separate tape portions as the screws are successively driven home.

BRIEF DESCRIPTION OF THE DRAWINGS

In the drawings wherein like reference characters indicate like or corresponding parts.

DETAILED DESCRIPTION OF PREFERRED EMBODIMENTS OF THE INVENTION

Figure 1:
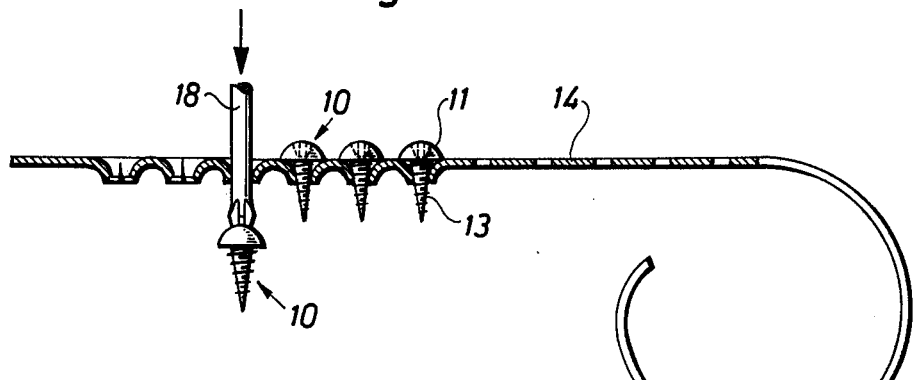
FIG. 1 shows diagramatically in side-view a portion of a fastener package according to the invention.
Figure 2:
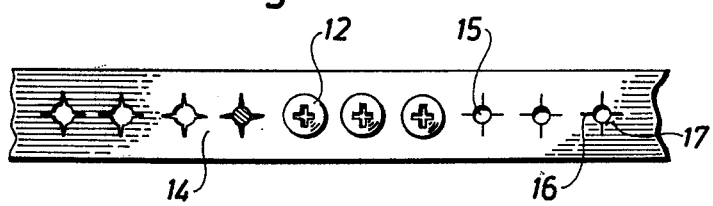
FIG. 2 shows the fastener package of FIG. 1 in plan view.

In the embodiment of the invention as illustrated in FIGS. 1 and 2 the fasteners comprise comparatively short screws 10, such as self-tapping screws for sheet metal, which in the example shown have a rounded head 11 with a drive recess 12, and a tapering threaded shank 13.

The screws 10 are carried evenly spaced on a carrier tape 14 with the screw shanks passing through the tape and with the under side of the screwheads resting on the upper side of the tape 14. As will be noted from FIG. 2 the tape 14 is provided with evenly spaced holes 15 the diameter of which is slightly less than that of the screw shanks as measured immediately adjacent the under side of the screw head. As clearly shown in FIG. 2 the holes 15 have slots extending radially therefrom, such as slot 16, between which slots there are formed lips, such as lip 17.

As shown in FIG. 1, as the screws 10 are affixed to the tape 14 by introduction of the screw shanks 13 into the holes 15 the lips 17 are slightly bent downwardly while frictionally engaging the screw shanks 13 so as to retain the screws 10 from withdrawal from the tape 14. As the lips 17 are bent downwardly and inwardly, the innermost ends of the lips will engage with the threads of the screws in a very positive manner to positively lock the screws in place.

The left hand end of FIG. 1 shows the screw in the course of application thereof. The screw is pushed through the carrier tape 14 by means of the bit end 18 of a suitable screw tightening apparatus. To prevent the edge of the under side of the screw from tearing loose portions of the carrier strip, the radial slots have to be of a suitable length so that the lips 17 may deflect laterally and readily permit passage of the screw head 11.

Figure 3:
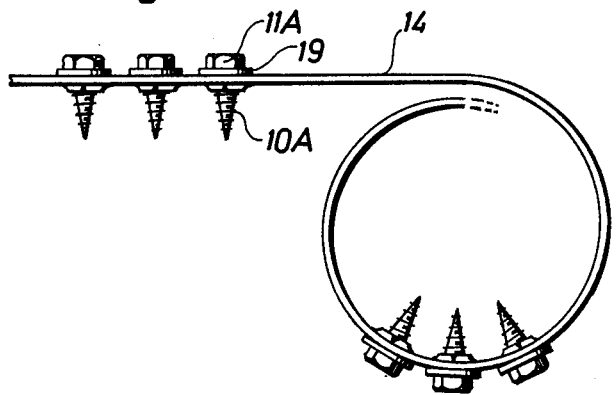
FIG. 3 shows diagramatically, in side-view, a portion of a second embodiment of a fastener package according to the invention.
Figure 4:
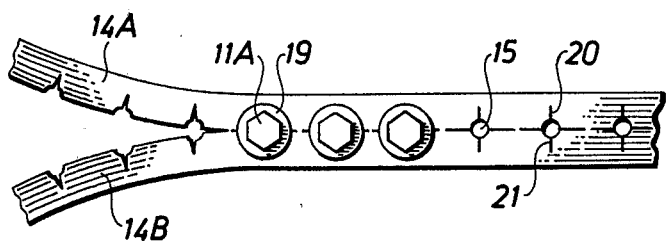
FIG. 4 shows the fastener package of FIG. 3 in plan view.

The embodiment of the fastener package as shown in FIGS. 3 and 4 is similar to the one decribed above with the exeption that the screws 10A in this second embodiment have hexagonal heads 11A, and are provided with a suitable washer 19. In this second embodiment, however, the ends of those radial slots of adjacent holes 15 which run longitudinally of the carrier tape 14 are comparatively closely spaced, viz. in a manner to form weakenings which readily permit the carrier tape 14 to be split up into two separate tape portions, such as portions 14A and 14B, as the screws 11A are successively pushed through the carrier tape 10 to be started and subsequently driven home. Preferably, at least two opposite slots extending from each hole 15, such as slots 20,21 in FIG. 4, should be oriented transversely of the carrier tape 14 so as to facilitate bending thereof sidewardly, as shown in the left hand portion of FIG. 4, to minimize the risk for particles to be torn off from the carrier tape 14 as the screws 11A are pushed through the carrier tape on application.

The carrier tape 14 may consist of cardboard, for instance, which should possess a suitable stiffness, so as to permit the carrier tape with the fasteners to be wound up into the spiral configuration, as shown diagramatically in the right hand portion of FIG. 3, for loading into the magazine of a screw tightening apparatus, but still so as to afford the requisite stability for a secure holding of the screws and for a reliable guidance of the carrier tape in the screw tightening apparatus.

For certain applications it may be found desirable to make the carrier tape from a plastic material which has been suitably "oriented" by stretching thereof. By such stretching it is possible to produce a material which splits up considerably easier longitudinally than transversely thereof. In such a case the longitudinal slots might be formed as comparatively short weakenings, or they could probably be omitted entirely, whereas it would still be ensured that the carrier tape on application of the screws will be split up into two separate tape portions each of which would be very resistant against tearing off of small particles.

What I claim is:

1. A strip of screws for use in a screw applying device, comprising:
   a. A nonmetallic flexible carrier tape adapted to be coiled and having a series of holes therein disposed at equal intervals, there being a pair of radial longitudinal slits and a pair of radial transverse slits extending from each hole and defining lips between adjacent slits, said longitudinal slits extending longitudinally into proximity with the longitudinal slits of adjacent holes;
   b. a series of metal screws disposed in said holes and each screw having a head disposed against said tape, the shank of each screw having a diameter greater than the diameter of the hole; and
   c. said lips being displaced out of the plane of said tape with the distal end of at least one said lip at each hole disposed between adjacent turns of the screwthread in axial locking relationship;

whereby the portion of said strip lying between said adjacent longitudinal slits is fractured as the screw head is driven through the strip.

2. A strip of screws for use in a screw applying device comprising:
   a. a carrier tape of resilient flexible sheet material having a series of holes therein disposed at equal intervals, there being slits extending outwardly from each hole and defining lips between adjacent slits;
   b. a series of screws each having an enlarged head and a shank, said screws being disposed in said holes with the heads thereof disposed on one side of the carrier tape, the shank of each screw having a central core and a screwthread extending radially outwardly therefrom; and
   c. the diameter of said holes being smaller than that of said central core, said lips being displaced out of the plane of said tape with the distal end of said lips resiliently engaging said screw shank in axial retaining relationship, and the length of said slits being long enough to enable said lips to yield to easily let through the enlarged head of the screw while simultaneously being short enough to ensure maximum resilient holding force of said lips toward the screw shank.

3. A strip of screws as claimed in claim 2 in which the distal ends of said resilient lips engage said central core.

4. A strip of screws as claimed in claim 2 in which the distal end of at least one of said lips at each hole is disposed between adjacent turns of the screwthread in axial locking relationship.

5. A strip of screws according to claim 2 in which at least one of said resilient lips engages the screwthread immediately adjacent to said head at the other side of said tape.

6. A strip of screws as claimed in claim 2 in which said tape has a stiffness sufficient to be properly guided in the screw applying device and has a flexibility sufficient to permit coiling of the screw strip for being disposed within a screw strip magazine of the screw applying device.

7. A strip of screws according to claim 6 in which the axis of said strip when coiled is transverse to the axis of said screws.

* * * * *